(12) United States Patent
Niskanen et al.

(10) Patent No.: US 6,486,448 B1
(45) Date of Patent: *Nov. 26, 2002

(54) METHOD FOR HEATING OF A ROLL AND A HEATABLE ROLL

(75) Inventors: Juhani Niskanen, Muurame; Juhani Vestola, Jyväskylä, both of (FI)

(73) Assignee: Metso Corporation, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 08/266,152

(22) Filed: Jun. 27, 1994

Related U.S. Application Data

(63) Continuation of application No. 07/746,111, filed on Aug. 15, 1991.

(30) Foreign Application Priority Data

Aug. 15, 1990 (FI) .................................................. 904032

(51) Int. Cl.$^7$ ............................. B21B 27/06; H05B 3/02
(52) U.S. Cl. ....................... 219/469; 219/470; 219/471; 432/228
(58) Field of Search ............................... 219/469, 470, 219/471, 216; 355/290; 29/116.1, 116.2; 432/228, 60

(56) References Cited

U.S. PATENT DOCUMENTS

| | | | | |
|---|---|---|---|---|
| 1,388,215 A | * | 8/1921 | Tate | 219/470 |
| 2,834,860 A | * | 5/1958 | Claiborne | 219/469 |
| 3,182,587 A | | 5/1965 | Woodhall | 425/143 |
| 3,239,652 A | | 3/1966 | Price | 219/469 |
| 3,278,723 A | * | 10/1966 | Toorn | 219/470 |
| 3,624,353 A | * | 11/1971 | Bjorklund | 219/470 |
| 3,637,984 A | * | 1/1972 | Irvine | 219/471 |
| 3,805,020 A | * | 4/1974 | Bates | 219/469 |
| 4,282,639 A | | 8/1981 | Christ et al. | 492/7 |
| 4,560,860 A | * | 12/1985 | Fauser | 219/470 |
| 4,747,195 A | * | 5/1988 | Snellman | 29/116.2 |
| 4,990,751 A | * | 2/1991 | Nous | 219/469 |
| 5,821,498 A | * | 10/1998 | Niskanen et al. | 219/469 |

FOREIGN PATENT DOCUMENTS

| | | |
|---|---|---|
| DE | 839 446 | 5/1952 |
| DE | 3612207 A1 | 6/1986 |
| DE | 3511903 A1 | 10/1986 |
| DE | 3612207 | * 11/1986 |
| FR | 1462089 | 12/1965 |
| GB | 1113208 | 9/1965 |

OTHER PUBLICATIONS

European Search Report, Application No. EP 91 85 0197, date of completion of search Nov. 8, 1991.
Annex to the European Search Report, Application No. EP 91 85 0197, date Nov. 8, 1991.

* cited by examiner

Primary Examiner—Teresa Walberg
Assistant Examiner—Shawntina Fuqua
(74) Attorney, Agent, or Firm—Cohen, Pontani, Lieberman & Pavane

(57) ABSTRACT

A heated roll and a method for heating of a roll, in particular of a press roll or calender roll in a paper or board machine. The roll has a hollow, tubular roll mantle. The roll is heated with electric current by means of electrical resistors fitted inside the body material of roll mantle. The heating is preferably applied to the roll substantially at the proximity of the face of the roll mantle, and the electric current may be supplied to the electrical resistors from the ends of the roll through glide rings.

17 Claims, 3 Drawing Sheets

METHOD FOR HEATING OF A ROLL AND A HEATABLE ROLL

This is a continuation, of U.S. application Ser. No. 07/746,111, filed Aug. 15, 1991.

FIELD OF THE INVENTION

The present invention concerns a method for heating a roll, in particular of a press roll or calender roll in a paper or board machine, said roll comprising a hollow, tubular roll mantle.

The present invention also concerns a heatable roll intended for carrying out the method, in particular a press roll or calender roll in a paper or board machine, comprising a hollow, tubular roll mantle, which is provided with heating means for heating of the roll mantle.

BACKGROUND OF THE INVENTION

The rolls are used in paper machines and in paper finishing equipment for performing various functions at a number of locations. The most common places for the use of such hot rolls are in calenders and presses, as well as in supercalenders. The commonest solution used in the art for heating of a roll is to introduce the heat into the roll by means of a suitable heat transfer medium, such as water or, if a roll operating at an even higher temperature than is possible using water is required, by means of oil. A number of different methods and solutions for the heating of rolls are known in the art. The oldest prior-art solution is one in which a through hole is drilled into the center of a massive roll, and the heat transfer medium is circulated through this hole in order to heat its surface. However, it is an essential drawback of such a solution that the distance from the heat transfer medium to the face of the roll is very large, thus efficient and economical heating cannot be achieved by means to this solution, since the heat must be conducted through the entire material of the roll. A second, more advanced solution is one in which the roll comprises a non-revolving cylindrical body or axle on which a revolving roll mantle is mounted. In this solution, the heat transfer medium, which may be water or oil, is flows through the space between the non-revolving body and the roll mantle, to heat the roll mantle. This method reduces the distance through which the heat must be conducted to effectively heat the roll surface. One solution of this type is described, e.g., in EP Patent Application No. 0,188,238. However, it is an essential drawback of such a solution that a large quantity of liquid must be dealt with. This is because the free space for the flow of the liquid in the roll is large, and this fluid must be circulated in order to maintain operating temperature, Further, because of the great volume of heat-transfer liquid, the method of incorporating a roll of this type characteristically has a very high power consumption. Other heatable rolls are known, which heat the roll with a similar construction, e.g., in the FI Patent Application Nos. 840,458, 862,189 and 864,020 as well as EP Patent Application No. 0,158,220. A further solution for providing a heated roll is one in which a number of through-bores are formed axially oriented in the roll in which the heat-transfer medium is circulated. One such solution is described in prior art, e.g., in the Canadian Patent No. 1,223,763. All of the prior-art heatable rolls described above involve the drawback already stated above, i.e. that large quantities of liquid must be dealt with due to the necessity of fluid circulation and heating of the fluid outside the roll. It is a further drawback that the heat-transfer medium must first be heated in some suitable way, e.g. by means of electric power, prior to being pumped through the bores of the roll. The power consumption required to operate such rolls is remarkably high.

The prior art also discloses variable crown rolls which are heatable. Examples of such solutions are described in U.S. Pat. Nos. 4,282,639 and 4,679,287. In U.S. Pat. No. 4,282,639, the roll is heated by an arrangement of spraying devices, fitted in the interior of the roll, into which devices a heated heat-transfer medium is fed and sprayed onto the inner face of the roll mantle, to heat the roll mantle. On the other hand, in the U.S. Pat. No. 4,679,287, the heating of the roll is arranged so that the heating medium is passed directly into the interior roll, into the space between the stationary roll axle and the roll mantle for the purpose of heating of the roll mantle. With regard to heating the roll mantle, such variable crown rolls also involve the same drawbacks as were already discussed earlier, including dealing with the large quantities of liquid, the problems related to the heating of the heat-transfer medium, as well as the high power consumption of the apparatus.

OBJECTS OF THE INVENTION

It is an object of the invention is to provide a method for heating a heatable roll wherein the power consumption of the roll is reduced while at the same time achieving a more uniform heating of the roll mantle. In view of achieving these objectives, the method of the present invention is characterized in that the roll is heated by electric heaters, e.g. by passing an electric current through electrical resistors, which are contained in the body material of the roll mantle.

If is another object of the present invention that the heating means for the roll comprises ducts, conduits or the equivalent, which have been formed into the body material of the roll mantle, extending from one end of the roll to the other, with electric heaters fitted in the ducts and connected to an electrical power source in order to heat the electric heaters inside the body material of the roll mantle.

It is a further object of the present invention to provide a variable crown roll having electric heaters formed material of the roll mantle.

It is a still further object of the present invention to provide an electrically heatable roll in which the heating elements are divided into axially spaced zones, wherein the heating of each zone is controllable.

SUMMARY OF THE INVENTION

By means of the present invention, a number of remarkable advantages are obtained, as compared with the prior art. In the method in accordance with the present invention, the quantity of oil or other heat-transfer medium required is small and, in connection with variable crown rolls, the medium can be maintained at a comparatively low temperature. Since, in the present invention, the heat is introduced at a position very close to the outer surface of the roll mantle, the thermal strains can be reduced and maintained at low levels, and the temperature profile of the roll can be kept substantially more uniform than in rolls heated by a means of a circulating liquid. Large temperature gradients which may occur in the roll mantle in the prior art methods are eliminated. In connection with a roll in accordance with the present invention, in heating the surface it is unnecessary to use various complicating devices placed external to the roll such as a liquid heater and circulating pump. Further, the heating efficiency can be made optimal, almost 100 percent, because the heat dissipation is almost entirely through the roll face, and other sources of inefficiency are almost entirely eliminated.

A roll in accordance with the invention is also inexpensive to manufacture. The roll can be constructed out of commercially available components. In addition to allowing maintenance of a uniform temperature profile, the present invention facilitates the limited warming of the end areas of the roll in the desired way through zoned heating. Further advantages and characteristic features of the invention are apparent from the following detailed description of the invention.

BRIEF DESCRIPTION OF THE DRAWINGS

The preferred embodiments are shown by way of example in the accompanying drawing, in which.

DETAILED DESCRIPTION OF THE PREFERRED EMBODIMENTS

Figure 1:
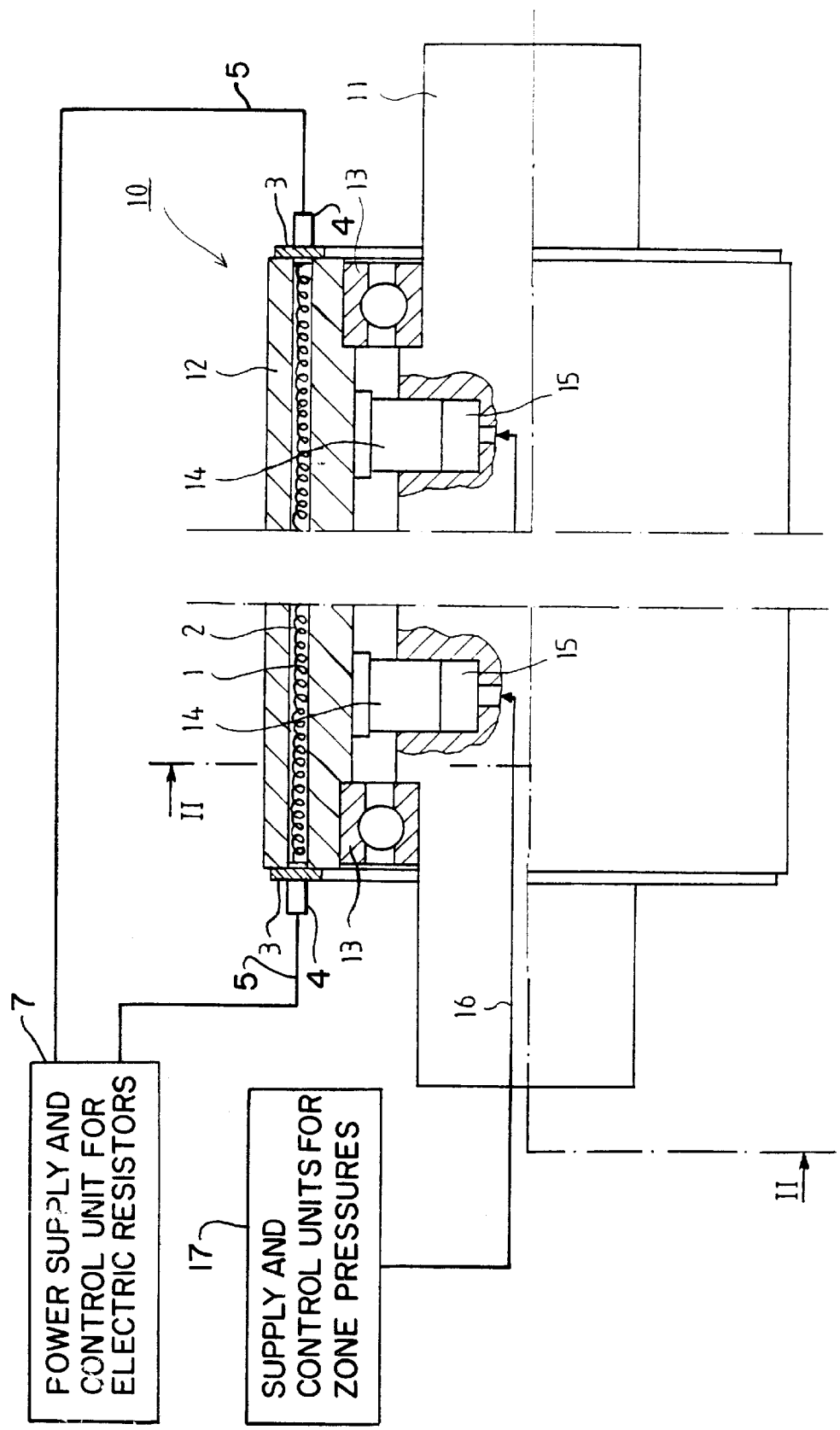
FIG. 1 is a longitudinal vertical view of a roll in accordance with the invention partly in cross-section on an axial plane with a block diagram of the controls.

In FIG. 1, the roll in accordance with the present invention is denoted generally with the reference numeral 10. The roll 10 shown in FIG. 1 is a variable crown roll, comprising a stationary roll axle 11, on which the roll mantle 12 revolves. The mantle 12 revolves around the roll axle 11 and is mounted by means of end bearings 13. Hydraulic loading means 14 are provided in the space between the mantle 12 and the axle 11 of the variable crown roll 10. The hydraulic loading means 14 are supported on the roll axle 11 and act against the inner face of the roll mantle 12 so that the profile of the roll mantle 12 can be thereby regulated and adjusted. In the embodiment shown in FIG. 1, the pistons of the hydraulic loading means 14 are fitted in cylindrical bores 15 formed into the roll axle 11. A pressure transmission medium, such as hydraulic oil, is passed along pressure ducts 16 formed into the roll axle 11 and into the cylindrical bores 15, underneath the pistons of the hydraulic loading means 14 the pressure is adjusted by the supply and control units 17 for the zone pressures, which supply the hydraulic oil to the pressure ducts 16. Thus, the profile of the roll mantle 12 may be adjusted according to known methods to a desired profile by providing a sufficient number of hydraulic loading means 14 spaced in the axial direction of the roll axle 11. Such a method is disclosed in U.S. Pat. No. 4,791,863, which is herein incorporated by reference. Each of the hydraulic loading means 14 may be independently controlled by a separate pressure control device which may comprise hydraulic pressure regulator or the like, and may be adjusted to provide an optimum profile of the variable crown roll mantle 12 while it revolves about the roll axle 11. Thus, for example, if there is wear on the roll mantle 12, the hydraulic load means 14 can be used to compensate and extend the useful life of the roll mantle 12 prior to regrinding its surface or otherwise repairing or replacing it.

As a method of adjusting the crown roll 10, a sensor or sensor array (not shown) can be arranged at a distance after the roll 10 in the path of the paper to indirectly measure the profile through, a parameter of the paper web correlated with the roll profile. If, for example, the roll 10 is a press roll in a paper machine, a sensor or sensor array located subsequent to the roll would detect a parameter which is correlated with the action of the press roll, i.e. the moisture content or caliper of the paper web, at an axial position of the roll. If, for example, the control receiving input from the sensor detects that at a particular axial position of the roll, the moisture content of the paper is too high, the control would output a signal indicating a necessary correction to the roll profile, which would result in an adjustment of the pressure in the cylindrical bores 15 and resulting changes in roll profile by the action of the hydraulic loading means 14. An increased pressure in a cylindrical bore 15 will cause an extension of the corresponding hydraulic loading means 14, which will produce a corresponding deformation of the variable crown roll 10. This deformation would then increase the water extraction and therefore decrease the moisture content in the paper web at a position corresponding that axial position of the roll. Thus, through the use of an appropriate sensor system, control system and actuator system, the function of the variable crown roll may be improved to reduce the temporal and spatial variability of the web of paper in the paper machine. Further, the useful life of the roll mantle 12 may be increased and the product quality improved, as well as reducing the down time of the apparatus.

The control for adjusting the crown may also be a conventional control as disclosed in U.S. Pat. No. 4,646,921, corresponding to German Patent DE No. 3,117,516. The control may be manually operated, or can be a digital or an analog computer, which may receive inputs not only from the sensor or sensor array, but may also communicate with a central control for the paper machine, not shown in the drawings.

It should be noted that, in the present variable crown roll 10, the profile of the roll mantle 12 is a function of a position of each of the hydraulic loading means 14. Therefore, even small corrections may require the readjustment of many actuators, comprising the hydraulic loading means 14. Because of the interactive nature between the actuators, a simple control system, wherein a single sensor of the sensory array dictates the movement of a corresponding single hydraulic loading means 14 at a corresponding axial location, would not necessarily produce an optimum correction, and therefore a complex feedback system for controlling the profile is preferable, as is disclosed in U.S. Pat. No. 4,791,863, wherein the interaction of the profile control elements is taken into consideration.

The profile deformation characteristic of the variable crown roll 10 may be determined prior to use or through use, in which case an algorithm could be derived which would have as an input the output of a sensor or sensor array for detecting the roll profile or a process variable which is correlated with the roll mantle profile, i.e. moisture content or paper web caliper. These sensor or sensor array output variables, as processed according to the algorithm, would then result in a control variable array representing a desired state of the roll mantle 12 and therefore the desired movement of the array of hydraulic load means 14. Thus, the possibility of unwanted "searching" for an optimum roll profile, instability or oscillation may be substantially reduced or eliminated. Further, the algorithm could also be used to determine when the roll mantle 12 must be replaced by providing an output indicating that the amount of roll profile correction required is at either a maximum, or that the sensor array pattern is indicative or a roll mantle in need of imminent replacement or repair. This would allow servicing during routine plant shutdowns, rather than during abnormal shutdown because of unexpected equipment failure.

An automatic or computerized control, in addition to storing information regarding the normal parameters of the variation in roll mantle 12 profile with hydraulic loading at the axial loading positions, can also learn the specific pattern of a given roll mantle 12 as it ages by means of "signature analysis" or the like. Since the roll mantle 12 is continually subject to wear, stress and strain, random latent defects or imperfections may eventually come to light. Intermantle variations may result in a particular mantle which has a variable crown characteristic which differs from a standard mantle. Thus, by analyzing the operation of the roll mantle 12, a more accurate profile control algorithm may be executed based on an analysis of variations from the expected response. The control may be executed according to traditional multivariable analysis, neural network or fuzzy logic methods, and may incorporate high order control schemes (e.g. Proportional-Integral-Differential [PID] control) to name a few. These methods and their application are known to those skilled in the art.

If the roll, instead of a press roll, is a calender roll, then the control variable could be related to the surface finish of the paper web. However, the control is basically the same, but with respect to a different control variable type. Of course, it should be realized that more than one variable could be measured at any given time, such as reflectance, transmittance, optical properties at various wavelengths, etc., and the sensor system may be a single sensor that scans the entire web, a plurality of sensors in a linear array, or even a plurality of arrays of sensors, according to the needs and design of the apparatus.

Figure 2:
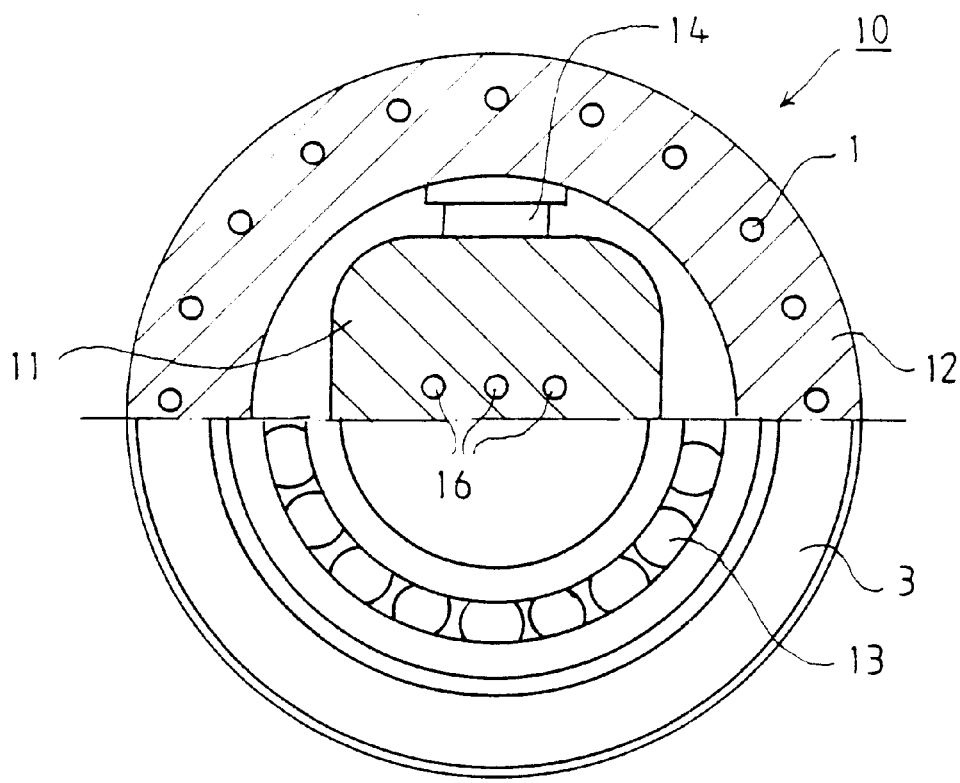
FIG. 2 is a sectional view of a roll as shown in FIG. 1, taken along the line II—II.

In addition to the fact that the roll shown in FIGS. 1 and 2 is a variable crown roll, the roll mantle 12 is also heatable. In a first embodiment of the invention, for the purpose of heating, through axial holes 1 have been formed into the roll mantle 12. These holes are preferably drilled. Electrical resistors 2 are inserted into the holes 1 and extend the entire length of the holes 1. These electrical resistors 2 are commercially available electrical resistors or resistor cables.

At the ends of the roll mantle 12, glide rings 3 or contact rings are provided, through which the electric power is supplied to the electrical resistors 2. Brushes 4 (contactors) slide on the glide rings 3 to transmit electric power to the electrical resistors 2. Connecting cables 5 connect the brushes 4 with the power supply and control unit 7 for the electrical resistors 2. The holes 1 are provided in the roll mantle 12 as close as practical to the roll face in order that the thermal strains in the roll should be as low as possible and that the temperature gradient in the mantle 12 should also be small. In FIGS. 1 and 2 a single ring of holes is formed into the roll mantle 12. However, if necessary, a number of rings of holes may be formed, varying in the radial distances of the rings of holes from the center axis of the roll mantle 12. The diameter of the holes 1 does not have to be large, for even holes of a diameter of, e.g., 10 mm are sufficiently large for the resistors 2 to be inserted into the holes 1. While in a preferable embodiment described above, it was stated that attempts are made to place the holes 1 as close to the roll face as possible, the holes 1 can, however, be formed at a distance from the roll face, in order to take advantage of the thermal averaging effect of the mantle material, which would reduce local temperature variations on the roll outer surface. It should be noted that the thermal losses from the roll mantle will be greater from the roll outer surface than the roll inner surface. In order to reduce the temperature gradients in the roll mantle, in general, the heating elements and therefore the holes in which they reside should be located closer to the outer surface than the inner surface.

Thus, the holes 1 are positioned to balance a number of factors. First, the further the heating elements (electrical resistors 2) are from the surface, the greater the degree of heat integration and reduction in surface temperature variation by the roll mantle 12. The second factor, however, relates to the fact that the efficiency of electrical heating is reduced as the elements are located radially closer to the axis of the mantle because more power is lost through the inner surface of the roll mantle 12. Further, increased thermal strains and temperature gradients also result from a more central location of the electrical resistors 2 which act as the heating elements. Thus, an optimal location can be found for the positioning of the holes 1, which location is chosen so as to minimize the wave-like surface temperature variation of the roll mantle 12 while also considering the countervailing factors. Of course, practical factors relating to the fabrication and operation of the roll mantle 12 become relevant. For example, it is considered impractical to have the electric heaters directly on the outer surface of the roll, which is a functional surface.

Figure 3:
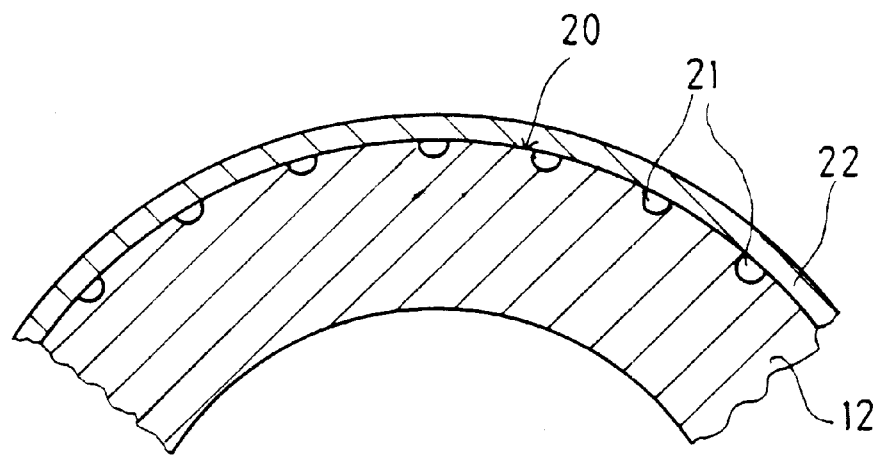
FIG. 3 is a partial sectional view of a second embodiment of a roll mantle in accordance with the invention.
Figure 4:
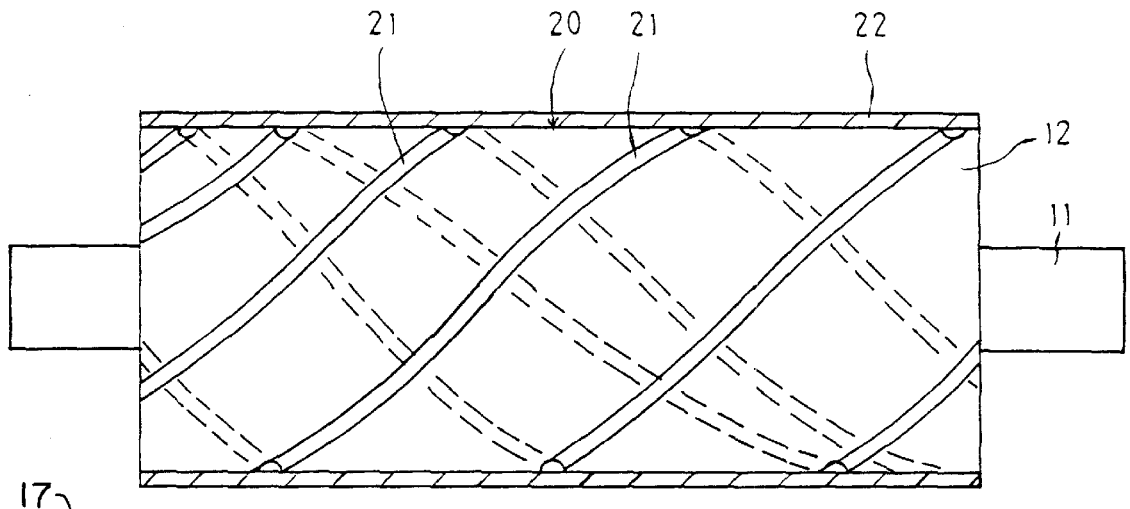
FIG. 4 is a partial sectional view of an alternative embodiment of a roll in accordance with the invention, along an axial plane.

In the embodiment shown in FIGS. 1 and 2, the holes 1 are formed in the roll mantle 12 preferably by drilling. The holes can also be formed in the roll in some other way, and an example of this is shown in the partial sectional view of FIG. 3. In the embodiment shown in FIG. 3, grooves 21 have been formed on the outer face of the roll mantle 12. The roll mantle 12 is covered with an outer coating face 22 of the roll, formed in some suitable way. In the embodiment shown in FIG. 3, the coating face 22 is formed of a steel sheet which has been applied to the roll mantle 12 and is fixed to the roll mantle 12 by welding thus forming a steel shell. The final structure, having longitudinal apertures in the roll mantle 12 body material, can also be fabricated so that deep grooves 21 are formed in the outer face 20 of the roll mantle 12. The grooves 21 are then closed or covered from the outside face 20 surface , e.g., by welding, whereby the grooves 21 become similar to the holes 1 shown in FIGS. 1 and 2. Since, in the embodiment of FIG. 3, the holes provided for the electrical resistors 2 were not formed in the roll by drilling, they need not necessarily be linear nor axially aligned with the roll. By means of such holes, whose orientations differ from the axial direction, compared with axially oriented holes the advantage may also be obtained that, by means of such "diagonal" holes, vibrational problems, which may be caused by or related to axially oriented spaced ducts below the roll surface are avoided. In a case in which the holes have not been formed into the roll be drilling, the orientation and arrangement of the holes can differ significantly from an axial orientation, so that the holes may attain a spiral shape. An exaggerated embodiment representing such a possibility is shown in the solution of FIG. 4. In FIG. 4, spiral shaped grooves 21 extending from one end of the roll to the other end have been formed into the face 20 of the roll. The grooves 21 have been covered with a suitable coating face 22. The coating face 22 may be formed onto the roll, e.g., out of a steel sheet welded to the surface of the roll mantle 12 or by welding over the grooves to form ducts, as was previously explained above.

Figure 5:
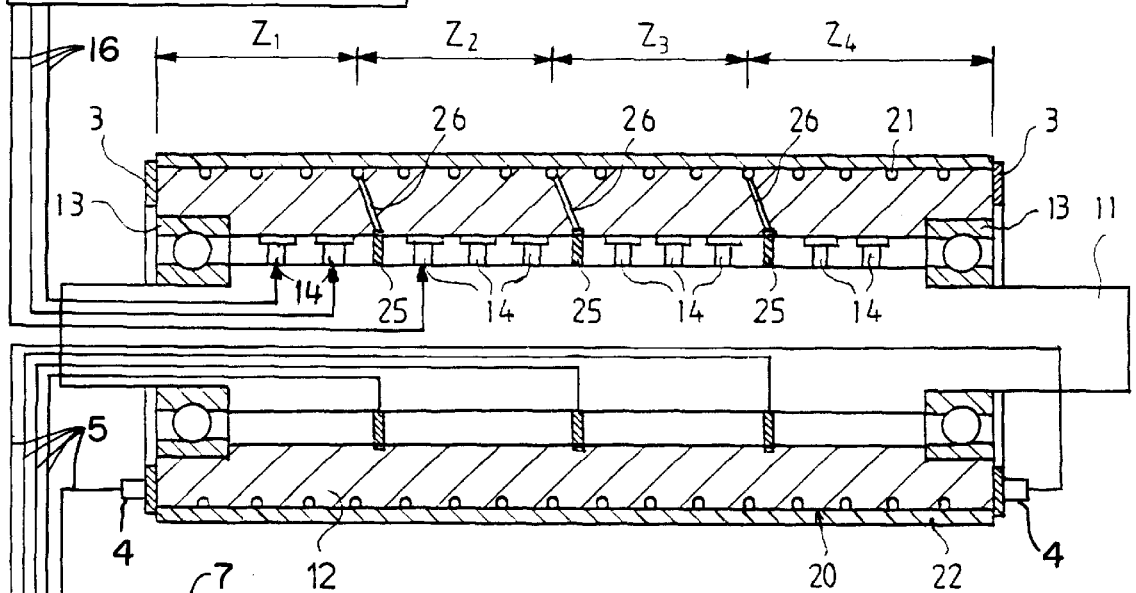
FIG. 5 is a partly sectional view of a further alternative embodiment of a roll in accordance with the invention, along an axial plane with a block diagram of the controls.
Figure 5:
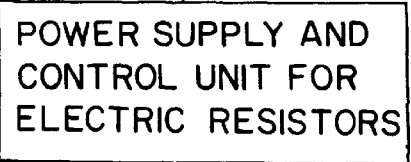

In FIG. 5, a further embodiment of the solution in accordance with the invention is shown. The roll shown in FIG. 5 is a variable crown roll, which comprises a stationary axle 11, in a way corresponding to FIGS. 1 and 2, on which axle 11 the roll mantle 12 revolves by means of end bearings 13. Into the outer face 20 of the roll mantle 12, spiral-shaped grooves 21 having a steep inclination have been formed, which are covered from outside by means of a suitable coating face 22. In the space between the roll mantle 12 and the roll axle 11, hydraulic loading means 14 are arranged, by whose means the deflection profile of the roll mantle can be adjusted in the desired way. The embodiment shown in FIG. 5 differs from those described above in the respect that the roll in accordance with FIG. 5 is arranged into a number of heating zones, each adjustable with respect to temperature. For this purpose, connecting bores 26 are provided from the inner face of the roll to the spiral-shaped grooves 21, or to the ducts defined by the grooves 21 and the coating face 22. The connecting bores are formed into the roll mantle 12 generally radially oriented and uniformly spaced in the axial direction of the roll so that together with the roll ends, the connecting bores 26 divide the roll into zones $Z_1$ to $Z_4$ in the axial direction. Electric conductors are fitted into the connecting bores 26 which are connected to the electrical resistors 2, on one hand, and to electrical contacts 25 fitting in the interior of the roll, on the other hand. In this embodiment both the brushes 4 for transmitting power to the glide rings 3 and the electrical contacts 25 for transmitting power to the electrical contact 25 receive electrical power from connecting cables 5 which in turn are connected to the power supply and control unit 7 for the electrical resistors.

By means of this arrangement, through the brushes 4 and the electrical contacts 25, currents of different intensities can be fed into the different zones $Z_1$ to $Z_4$ in the roll, whereby, means of the electrical resistors 2, different heating effects can be provided for the different zones $Z_1$ to $Z_4$ in the roll. Thus, the roll in accordance with FIG. 5 is adjustable in zones with respect of the temperature. Of course it should be realized that any number of zones may be used.

As an additional embodiment of the invention, it is preferable that, in certain cases, the holes 1 or the corresponding grooves 21 formed into the roll mantle 12 are fully sealed and filled with a suitable heat transfer liquid, such as water. In such case, the heat transfer liquid present in the ducts defining the holes 1 or grooves 21 equalize the temperatures in the roll mantle 12. The heat transfer liquid does not circulate in the ducts defining the holes 1 or the grooves 21 or vent to the atmosphere, for which reason the pressure in the ducts becomes very high. In view of the operation of the roll 10, such an increase in pressure is, however, in no way harmful. The heat transfer liquid may also be maintained within heating zones, so that the zone heating effect may be preserved.

The heat from the resistive elements can be controlled in a number of ways. The power supply and control unit 7 for the electrical resistors may receive input from a sensor or sensor array which could directly sense the surface temperature of the roll mantle 12. Further, temperature sensors could also be located within the roll mantle 12 on coating face 22 or within the holes 1 or grooves 21. Direct measurement of roll mantle 12 surface temperature allows the temperature control to operate independently.

The temperature of the roll can also be inferred by means of an indirect measurement, i.e., the effect of the heat on the paper web. For example, in a press section, the heat from the roll acts to facilitate the elimination of water. Thus, the moisture content remaining in the paper web subsequent the roll is related to the temperature of the roll. Likewise, in a calender section, the heat helps produce a desired finish on the paper, which may be optically or otherwise measured. Thus, the temperature of the roll can be regulated based on its effect on the paper web, which can also be used to compensate for other variables in the system, such as a variation in moisture content in the paper web preceding to the roll, in order to provide a more optimally processed paper to the succeeding section of the machine. In such a case, the temperature control might be interactive with other process controls.

The temperature control can act to control power supplied to the electrical heaters in a number of ways. First a DC or AC voltage or current supplying the electrical resistors 2 could be varied, which according to Ohm's law, voltage equals resistance times current (V=IR), will vary the current or voltage, respectively flowing through the resistor. The power dissipation of a resistor is equal to voltage times current (P=IV, P=$V^2$/R or P=$I^2$R). Thus the power dissipation of the resistors is related to both the (root mean square) voltage or current input and the impedance of the resistor. Another method of controlling the power supplied to the resistors 2 is by waveform modulation, wherein electrical pulses are supplied, which vary in their duration and/or frequency in order to control the power. Pulse modulation has the advantage of facilitating electronic control over the power output, without need for separately modulating the intensity of voltage or current between the on and off states.

The electrical resistors 2 in holes 1 need not be of the same resistance, and, in fact, it might be desirable to use resistors having a different value at the ends of the roll mantle 12 than with control portion. Thus, in another embodiment a zone heating effect may be imparted by the choice of electrical resistors 2 as well as by varying the waveform, voltage or current input to the resistors. Since resistors connected in series conduct the same current, a resistor in series having a higher resistance will have a higher voltage drop and therefore a higher power dissipation.

In order to eliminate the contacts 25, various schemes may be used while maintaining a zone heating affect. For example, instead of purely resistive heating elements, Resistor-Inductor-Capacitor tuned elements (RLC networks) could be used. Heating could be controlled by frequency division multiplexing, wherein alternating current waveforms having differing frequencies are superimposed and transmitted over the same wires, so that the heat dissipation of a given heating element depends on the spectral power distribution of the exciting waveform. A tuned RLC network will have a peaked power dissipation at a given excitation frequency, so that differently tuned RLC networks could be situated in various zones. This arrangement would provide the advantage of requiring a reduced number of rotating electrical contacts, but with the added complexity of a high power frequency multiplexor as a part of the power supply and control unit 7 for the electrical resistors. Alternately, a portion of the control could be located within the roll structure to control the various heating zones, while requiring a single pair of power supply connections.

The control for the heating elements may be, but is not necessarily interactive with the control for the hydraulic loading means 14, e.g. in their collective effect on the moisture content in the paper web. Thus, since both the heat and pressure are used to effect the function of the roll, if the controls are integrated or communicate with each other, a single sensor array could be used to provide input for control of both aspects of the device operation. However, in practice, the controls may be separate from each other, especially if sensors are used which measure different aspects of the roll. Thus, the temperature could be controlled by a temperature sensor-based feedback control, while the profile could be controlled by a web sensor for determining a property of the web, for feedback to the supply and control units 17 for the zone pressure.

It should be understood that the preferred embodiments and examples described are for illustrative purposes only and are not to be construed as limiting the scope of the present invention which is properly delineated only in the appended claims.

What is claimed is:

1. A heated roll for a paper machine, comprising:
    (a) a rotatable hollow cylindrical roll mantle having an axis of rotation, an axial length, an inner diameter, an inner surface, an outer surface and conduits formed as drill holes between said inner and outer surfaces, and beneath said outer surface of said roll mantle so as to extend axially over the axial length of the roll mantle;
    (b) a plurality of electrical heaters located in said holes for receiving electrical power and heating said roll mantle;
    (c) a nonrotating axle, having a diameter smaller than said inner diameter and a central axis, said central axis being aligned with said axis of rotation;
    (d) a bearing, for rotatably supporting said roll mantle on said axle; and
    (e) an electrical contact means for receiving electrical power for said plurality of electrical heaters while said mantle rotates about said axle.

2. A heated roll according to claim 1 wherein said electrical heaters are electrical resistors.

3. A heated roll according to claim 1 wherein said electrical heaters are located in said mantle at a position closer to said outer surface of said mantle than said inner surface of said mantle.

4. A heated roll according to claim 2 wherein said electric contact means comprises a glide ring electrically connected to said electrical resistors, wherein said glide ring is located at an end of said mantle.

5. A heated roll according to claim 1 further comprising a plurality of heating zones, each of said heating zones further comprising a plurality of electrical heaters and an electric contact means, so that said electrical heaters in each of said heating zones may independently dissipate an amount of electric power so that different heating effects may be produced on said outer mantle surface at each of said heating zones.

6. A heated roll according to claim 1 wherein said roll mantle comprises a variable crown roll mantle and said roll further comprises means for adjusting a profile of said variable crown roll mantle.

7. A heated roll according to claim 6 wherein said adjusting means comprise a plurality of hydraulic actuators.

8. A roll mantle for use in a paper machine having a stationary axle, said mantle comprising a hollow cylindrical tube having an axial length, an inner surface and an outer surface, and a plurality of conduits formed as drilled holes between said inner and outer surfaces, and beneath said outer surface so as to extend axially over the axial length of the tube, a plurality of electrical heaters located in said holes for receiving electrical power and heating said roll mantle and means for receiving electrical power and supplying it to said heaters, said roll mantle being adapted for rotational mounting about the axle.

9. A roll mantle according to claim 8, wherein said hollow cylindrical tube comprises a variable crown roll mantle.

10. A roll mantle according to claim 8, wherein said electrical heaters are located closer to said outer surface than said inner surface.

11. A method for heating a press roll or a calender roll in a paper machine comprising a hollow cylindrical roll mantle mounted for rotation about a nonrotating axle, having an axial length, an inner and an outer mantle surface and electrical resistors for carrying electrical current located there between, in holes drilled beneath the outer mantle surface so as to extend over the axial length of the mantle, for heating the mantle, comprising rotating said roll mantle about said axle, receiving an electrical current from a current source and passing said electric current through the electrical resistors.

12. A method for heating a press roll or a calender roll in a paper machine according to claim 11, wherein the roll mantle has a plurality of heating zones comprising electrical resistors and electric current supply connections, comprising the step of introducing an independently adjustable electrical power into the electrical resistors in each heating zone so that different heating effects may be produced on the outer mantle surface at each of the heating zones.

13. A method for heating a press roll on a calender roll according to claim 12, wherein the electrical power is adjusted by varying an input voltage to the electrical resistors.

14. A method for heating a press roll on a calender roll according to claim 12 wherein the electrical power is adjusted by varying an input waveform to the electrical resistors.

15. A heated roll for a paper machine, comprising:
    (a) a rotatable hollow cylindrical roll mantle having an axis of rotation, an axial length, an inner diameter, an inner surface and outer surface and conduits formed as drill holes between said inner and outer surfaces, and beneath said outer surface of said roll mantle so as to extend axially over the axial length of the roll mantle;
    (b) a plurality of heating zones, each comprising a plurality of resistive electrical heaters located in said holes for receiving electrical power and heating said zone of said roll mantle and an electric contact means, so that said heaters in each of said heating zones may independently dissipate an amount of electric power so that different heating effects may be produced on said outer mantle surface at each of said heating zones;
    (c) a stationary axle, having a diameter smaller than said inner diameter and a central axis, said central axis being aligned with said axis of rotation;
    (d) a bearing, for rotatably supporting said roll mantle on said axle; and
    (e) an electrical contact means for receiving electrical power for said plurality of electrical heaters while said mantle rotates about said axle.

16. A rotational roll mantle for use in a paper machine having nonrotating crown variation means, said rotational roll mantle comprising a variable crown roll mantle having a hollow cylindrical tube, an axial length, an inner surface and an outer surface and a plurality of conduits formed as drilled holes between said inner and outer surfaces, and beneath said outer surface so as to extend axially over the axial length of the mantle, a plurality of electrical heaters located in said holes for receiving electrical power and heating said roll mantle and means for receiving electrical power and supplying it to said heaters, said rotational roll mantle being adapted for placement outside the nonrotating crown variation means.

17. A method for heating a press roll or a calender roll in a paper machine comprising a hollow cylindrical roll mantle mounted for rotation about a nonrotating axle, having an axial length, an inner and an outer mantle surface and electrical resistors for carrying electrical current located therebetween in holes drilled beneath the outer mantle surface so as to extend over the axial length of the mantle, for heating the mantle, wherein the roll mantle has a plurality of heating zones each comprising the step of introducing an independently adjustable electric power into the electrical resistors in each heating zone through the current supply connections so that different heating effects may be produced on the outer mantle surface at each of the heating zones.

* * * * *